United States Patent [19]

Sun

[11] 4,091,283
[45] May 23, 1978

[54] EXTREMELY SENSITIVE METALLIC VAPOR DETECTION

[75] Inventor: Kuan-Han Sun, Pittsburgh, Pa.

[73] Assignee: Westinghouse Electric Corp., Pittsburgh, Pa.

[21] Appl. No.: 592,855

[22] Filed: Jul. 2, 1975

[51] Int. Cl.² .............................................. G01T 1/161
[52] U.S. Cl. .................... 250/303; 250/304; 250/380
[58] Field of Search .............. 250/303, 304, 379, 380, 250/382, 383, 384, 432; 23/232 R, 254 R

[56] References Cited

U.S. PATENT DOCUMENTS

| | | | |
|---|---|---|---|
| 3,372,274 | 3/1968 | Landolt | 250/303 X |
| 3,590,247 | 6/1971 | Holford | 250/303 X |
| 3,655,982 | 4/1972 | Gelezunas | 250/303 X |
| 3,725,009 | 4/1973 | Lovelock | 250/303 X |

*Primary Examiner*—Davis L. Willis
*Attorney, Agent, or Firm*—Edward L. Levine; Z. L. Dermer

[57] ABSTRACT

An extremely sensitive metallic vapor detection method primarily for use in a sodium cooled nuclear reactor containment. Sodium vapor, or a compound derived from it, is allowed to react with a radioactively tagged substance so as to produce a radioactive gas. The released gas is monitored by a nuclear counter, which provides a direct indication of the presence of metallic vapor. The method is sensitive to the presence of metallic vapor in a gaseous environment in the range of $10^{-16}$ grams per cubic centimeter.

10 Claims, 1 Drawing Figure

U.S.Patent May 23, 1978 4,091,283
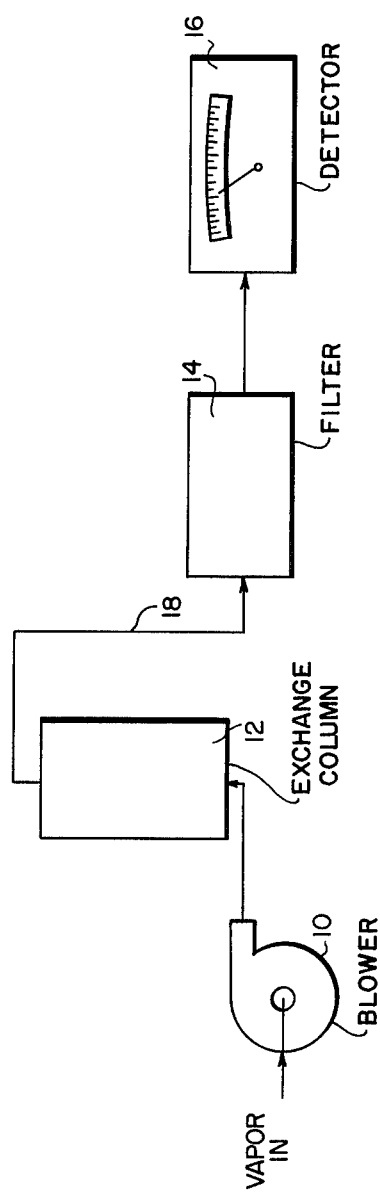

EXTREMELY SENSITIVE METALLIC VAPOR DETECTION

BACKGROUND OF THE INVENTION

1. Field of the Invention

This invention is directed to an extremely sensitive method for detecting the presence of a liquid metal fluid, primarily for use in liquid metal cooled nuclear reactors. More specifically, liquid metal vapor in an air sample is allowed to react with a radioactively tagged substance, whereby a radioactive gas is released in proportion to the amount of metal fluid and is monitored.

2. Description of the prior art

In all nuclear reactors, detection of leakage of reactor coolant from the primary system is of maximum importance to safe operation of the reactor facility. The earlier detection occurs, the less likely there will be detrimental effects to the reactor systems, to operating personnel, and to the environment. A detection system which can detect leaks of a small magnitude further insures that such small leaks will not be allowed to propagate.

The reactor primary system is typically enclosed in a large containment structure, and the atmosphere within the containment is controlled to minimize environmental releases. A containment structure is roughly 150 feet in diameter, and over 200 feet high, containing an internal free volume on the order of three million cubic feet. Small leaks of reactor coolant, therefore, are greatly diluted and require an extremely sensitive detection system. Some reactors use a liquid metal coolant, such as sodium, potassium, or a combination of the two ("NAK"). A primary system leak in such reactors will release such liquid metal as a vapor due to the high operating temperature of the reactor. This invention provides an extremely sensitive method for detection of the liquid metal, such as sodium, or "NAK," released as a vapor.

SUMMARY OF THE INVENTION

This invention provides an extremely sensitive method for detection of minute quantities of metal fluid in a gaseous atmosphere, particularly applicable to detection of sodium, potassium or "NAK" leakage from a liquid metal cooled nuclear reactor. In the main embodiment the method includes passing a sample air stream through an exchange column in which the liquid metal reacts with a compound tagged with tritium (T). The compound has a formula selected from the group XT, where X is —OH, —OT, RCCO—, and RO—, and R is —$C_nH_{2n+1}$ and $n$ can vary from about 1 to 20. Other suitable organic radicals, generally represented by R, can also be used. These compounds all react with a liquid metal, such as sodium, to release tritium. After filtration or cleaning of the stream to remove other materials, the resulting air containing tritium is analyzed by an ionization chamber or other nuclear detection devices, to detect tritium. Tritium detection indicates the presence of liquid metal in the sample. The apparatus used to carry out the detection method may be made very compact, and provides an extremely high sensitivity, in the range of $8 \times 10^{-16}$ grams of sodium per cubic centimeter of air sample.

In the event the moisture in the containment atmosphere has converted metallic sodium or potassium into NaOH or KOH, $C_nH_{2n+1}$COOT is desirably used in the column, where $n$ is equal to or greater than 6 and less than 20. Other similar high boiling organic acids may also be used. HTO will be formed and will be driven out as a vapor by heating the column. The HTO (tritiated water) is then converted to HT by passage through a heated metal such as magnesium. The HT is then detected as discussed above.

BRIEF DESCRIPTION OF THE DRAWING

The function and advantages of this invention will become more apparent from reading the following description in connection with the accompanying FIGURE, which is a simplified block diagram representation of the main apparatus used in applying the invention.

DESCRIPTION OF THE PREFERRED EMBODIMENTS

This invention provides a method for extremely sensitive detection of a liquid metal vapor. It is primarily for use in the containment structure of a nuclear reactor utilizing a liquid metal coolant such as sodium, potassium, or a combination of the two ("NAK"). Leakage from the primary system of such a reactor will be emitted as a vapor, such as metallic sodium vapor, due to the high operating temperature of the reactor. The basic principle of the detection method of this invention is to cause the sodium vapor to interact chemically with a radioactively tagged liquid or solid substance, such that a radioactive gaseous product is released. The resulting radioactive gas is then passed through a nuclear counter, such as an ionization chamber, where the radioactivity is measured. The radioactivity provides a proportional indication of the amount of sodium in the original vapor. Because of the extremely high sensitivity obtainable in radioactivity measurements, the metallic vapor can be detected in very minute quantities.

In the preferred embodiment, the tagging substance is tritium, an isotope of hydrogen with a mass of three and containing two neutrons and one proton in its nucleus. Tritium emits beta radiation, and has a half life of approximately 12.5 years. The tritium is placed in a chemical compound such as tritiated water, high boiling organic acids, and alcohols, which release tritium when they react with sodium vapor, as discussed below.

This reaction can generally be described as:

$$2XT + 2Na = 2XNa + T_2 \tag{1}$$

where
T = tritium
X = a chemical radical, such as —OH, —OT, RCOO—, and RO— and
R = —$C_nH_{2n+1}$,
where $n$ varies from about 1 to 20.
Although compounds with $n$ greater than 20 will provide the desired reactions, such compounds are more difficult to formulate and are therefore less desirable.

It can also be described as:

$$2XHT + 2K = 2XHK + T_2. \tag{2}$$

where T and X are defined as above with reference to equation (1).

Other suitable organic radicals, generally represented by R, can also be used. These include aliphatic acids or alcohols, or aromatic acids or alcohols, or combinations of these, as are well known to those skilled in the art.

The specific equations that follow are well known to those skilled in the art, and provide examples of the classes of compounds that may be employed in this invention.

EXAMPLE 1

In this example, X represents the hydroxide radical, —OH, and equation (1) becomes:

$$2HTO + 2Na = 2NaOH + T_2 \tag{3}$$

or, $$2HTO + 2Na = 2NaOT + H_2 \tag{4}$$

or, $$2HTO + 2Na = NaOT + NaOH + HT \tag{5}$$

As tritium and hydrogen are interchangeable in chemical reactions, on the average, one tritium atom is produced for every two sodium atoms. The chemical compound designated 2HTO is tritiated water, containing one tritium atom per molecule. Sodium and potassium are interchangeable, as in all of the Examples.

EXAMPLE 2

In this example, X represents an active radical of tritium and oxygen, (OT)— and equation (1) becomes:

$$2T_2O + 2Na = 2NaOT + T_2 \tag{6}$$

or, similarly, $$2T_2O + 2K = 2KOT + T_2. \tag{7}$$

$T_2O$ is tritiated water. One tritium atom is released for every atom of sodium or potassium.

EXAMPLE 3

In this example, X represents (RCOO)—, with R and n as defined above, and in this example, n + 6, then equation (1) becomes:

$$2C_6H_{13}COOT + 2Na = 2C_6H_{13}COONa + T_2 \tag{8}$$

$C_6H_{13}COOT$ is tritiated caproic acid, and
$C_6H_{13}COONa$ is sodium caproicate.

The interchangeability of various elements in these reactions, as shown in the prior examples, is also applicable. It is also to be noted that R can be other suitable organic radicals not in the class of $C_nH_{2n+1}$. The main active ingredient is the acid radical (COOT)—.

EXAMPLE 4

In this example, where X represents (RO)— and n = 4, equation (1) becomes:

$$2C_4H_9OT + 2Na = 2C_4H_9ONa + T_2 \tag{9}$$

$C_4H_9OT$ is tritiated butyl alcohol, and
$C_4H_9ONa$ is sodium butylate.

The starting compounds specifically shown in the above examples, and other compounds of the groups, may all be placed in liquid or solid form at the ambient temperature within a containment, 70° F to 110° F. Therefore, incorporating the compounds in a column through which the atmospheric stream is passed is relatively simple. The column need only be a sealed container to hold the liquid through which the gaseous sample stream is passed, or a container for the solid compound, against the surface of which the gaseous sample stream is passed. Some packing materials, such as ceramic packing rings or glass fibers, may be incorporated in the column to increase the reacting surfaces.

After the sample stream has passed through the column, it should desirably be filtered and cleaned to avoid any extraneous readings. In those cases where XT is a high molecular weight organic acid or alcohol, this filtration may be a mechanical means, such as a filter containing glass wool or a series of fine metal mesh to move any undesirable particulates carried over.

EXAMPLE 5

In the event the containment atmosphere is moist, any leaking sodium or potassium vapor will quickly react with the moisture to form NaOH or KOH, which will form fine suspended particles in the atmosphere. The organic acid, RCOOT, in the extracting column, will react with the NaOH or KOH as follows:

$$NaOH + RCOOT = RCOONa + HTO \tag{10}$$

A specific example where n = 6 is:

$$NaOH + C_6H_{13}COOT = C_6H_{13}COONa + HTO \tag{11}$$

The tritiated water (HTO) formed can be driven out by heating the column to a temperature slightly above 100° C. The HTO vapor thereby released may then be passed over a heated magnesium sponge or other metallic sponges with a large surface area, where it is converted to HT gas.

The final step in the instant invention is to detect the tritium resulting from passing the sample stream through the above described processes. Present state of the art ionization chambers and detection devices have a detection sensitivity of about $10^{-6}$ Ci/cc air. One $\mu$Ci of tritium is equivalent to $10^{-10}$ gm of tritium, and $10^{-6}$ $\mu$Ci is equivalent to approximately $8 \times 10^{-16}$ gm of sodium per 1 cc of air. Assuming a containment free volume of about 3,000,000 cubic feet, and assuming equal distribution of leaking sodium vapor throughout this free volume, this corresponds to:

$$\frac{8 \times 10^{-16} \text{ gm Na}}{1 \text{ cc air}} \times 3 \times 10^6 \text{ ft}^3 \times \frac{2.83 \times 10^4 \text{ cc}}{1 \text{ ft}^3} =$$
$$68 \ \mu\text{gm Na}.$$

Thus, a leakage of only 68 $\mu$gm of sodium throughout the entire containment will be detected by this invention method in a matter of seconds.

The FIGURE shows a simplified block diagram of the apparatus used in conjunction with the invention. Shown are a blower 10, an exchanger column 12, a filter 14, an ionization chamber detector 16, and conduits 18 connecting the apparatus. The blower 10 need only be sized for a small flow rate, in the range of about 1 to 2 cubic feet per minute. It may simply be a small fan, or suction pump, or simple jet pump, with the necessary capacity. The exchange column 12 will contain one or more of the starting compounds or mixtures as defined above. No temperature control of the column 12 is necessary, as it will operate in the temperature range of the controlled containment environment of a nuclear reactor, e.g. 70° F to 110° F. However, to ensure detection where the leaking sodium reacts with moisture in the containment atmosphere, as discussed above, the column 12 should be maintained at a temperature slightly in excess of 100° C to allow release of tritiated water as a vapor. The filter 14 is desirably a mechanical filter such as fine wire mesh or glass wool to remove any particulates carried from the column 12. As mentioned in conjunction with equation (11), the filter 14 may also be a heated magnesium sponge which converts water to gaseous HT. Ionization chamber detectors 16 and other nuclear detection devices are well known as a means to detect minute amounts of radioactivity, and are commercially available to achieve a high sensitivity. Such devices as the model 955B or FHT 112B available from Johnston Laboratories, Inc. of Cockeysville, Md. are applicable.

In addition to the high sensitivity, a distinct advantage provided by the instant invention is that the apparatus used to carry out the invention method may be made compact and portable. The column 12 and filter 14 each may have the external dimensions of a cylinder no larger than 1 foot high and several inches in diameter. Although the containment atmosphere is constantly circulating through cooling units and filtration systems of the containment, the small local blower 10 to pass the sample stream into and through the apparatus is easily portable. The local blower 10 may be sized to pass a minimum of 1 cubic foot per minute through the detection system. At this rate, the response time is a few seconds. The combined blower, column and filtration means in this specification are at times referred to as a "detector head," and collectively can be small enough to be contained in an enclosure of about 10 cubic feet. Therefore, a detector head can be placed almost anywhere in the containment, and connected to an ionization chamber. A plurality of detector heads may also be utilized, and connected to a single ionization chamber. Feeding from the detector heads to a common ionization chamber may be in series, or parallel, depending upon the time constant of the detection system and the particular operating procedures of the operating utility. If a common ionization chamber is used in conjunction with multiple detector heads, a central air suction pump may be connected downstream of the ionization chamber, eliminating any need for an individual blower at each detector head location.

It is therefore seen that utilization of the invention method will provide a very sensitive and compact early detection means for leakage of liquid metal coolant from a nuclear reactor. The method described utilizes tritium as the preferred radioactive tracer, although it will be recognized that other radioactive elements or compounds, such as 85 krypton clathrate, may also be used. Further, the method can be applied to other nuclear and non-nuclear systems where detection of minute amounts of liquid metals, such as sodium and potassium, are required.

What is claimed is:

1. A method of detecting the presence of a metallic vapor comprising a metal selected from the group consisting essentially of Sodium, Potassium, and mixtures thereof, in the containment atmosphere of a nuclear reactor, said method comprising:
   (a) passing a stream of said containment atmosphere through an exchange column, said exchange column which releases tritium when in contact with said metallic vapor comprising at least one chemical compound selected from the group consisting of XT, wherein T is tritium and X is selected from the group consisting of —OH, —OT, RCOO—, and RO—, and mixtures thereof, wherein R is —$C_nH_{2n+1}$ and where $n$ varies from about 1 to 20; and
   (b) then passing said stream through an ionization chamber which can detect tritium.

2. The method of claim 1 including passing said stream through filtration and cleaning means subsequent to passage through said column and prior to passage through said ionization chamber.

3. The method of claim 2 wherein said filtration means comprise at least one of a mechanical filter and a heated metallic sponge.

4. The method of claim 1 for detecting the presence of sodium.

5. An apparatus for detecting the presence of metallic vapor in an enclosed atmosphere, said vapor comprising a metal selected from the group consisting essentially of sodium, potassium, and mixtures thereof, said apparatus comprising:
   (a) an exchange column, said exchange column which releases tritium when in contact with said metallic vapor comprising at least one chemical compound having the formula selected from the group consisting of XT, wherein T is tritium and X is selected from the group consisting of —OH, —OT, RCOO—, and RO—, and mixtures thereof, wherein R is —$C_nH_{2n+1}$ and where $n$ varies from about 1 to 20;
   (b) means for conducting a portion of said atmosphere through said exchange column;
   (c) means for detecting the presence of tritium released by said column; and
   (d) means for passing the conducted portion of said atmosphere adjacent said detecting means.

6. The apparatus of claim 5 including means for filtering said conducted part of said atmosphere subsequent to its passing through said column.

7. A method of detecting the presence of a metallic vapor comprising a metal selected from the group consisting essentially of sodium, potassium, and mixtures thereof, in the containment atmosphere of a nuclear reactor, said method comprising:
   (a) passing a stream of said containment atmosphere through an exchange column, said exchange column which releases tritium when in contact with said metallic vapor comprising at least one chemical compound selected from the group consisting of an aliphatic acid, an aromatic acid, an aliphatic alcohol, an aromatic alcohol, and combinations thereof, wherein at least one of the hydrogen atoms of the acidic radical COOH— of said aliphatic acid and aromatic acid and of the alcoholic radical —OH of said aliphatic alcohol and aromatic alcohol is replaced with a tritium atom; and
   (b) then passing said stream through means for detecting the presence of tritium released by said column.

8. A method of detecting the presence of a metallic vapor comprising a metal selected from the group consisting essentially of sodium, potassium, and mixtures thereof, in the containment atmosphere of a nuclear reactor, said method comprising:
   (a) passing a stream of said containment atmosphere through an exchange column, said exchange column which releases tritium when in contact with said metallic vapor comprising at least one chemical compound selected from the group consisting of RT, wherein T is tritium and R is an organic radical; and (b) then passing said stream through means for detecting the presence of tritium released by said column.

9. An apparatus for detecting the presence of a metallic vapor in an enclosed atmosphere, said vapor comprising a metal selected from the group consisting essentially of sodium, potassium, and mixtures thereof, said apparatus comprising:
(a) an exchange column, said exchange column which releases tritium when in contact with said metallic vapor comprising at least one chemical compound having the formula selected from the group consisting of RT, wherein T is tritium and R is an organic radical;
(b) means for conducting a portion of said atmosphere through said exchange column;
(c) means for detecting the presence of tritium released by said column; and
(d) means for passing the conducted portion of said atmosphere adjacent said detecting means.

10. A method of detecting the presence of a metallic vapor comprising a metal selected from the group consisting essentially of sodium, potassium, and mixtures thereof, in an enclosed atmosphere, said method comprising:
(a) passing a stream of said atmosphere through an exchange column, said exchange column which releases tritium when in contact with said metallic vapor comprising at least one chemical compound selected from the group consisting of XT, wherein T is tritium and X is selected from the group consisting of —OH, —OT, RCOO—, and RO—, and mixtures thereof, wherein R is —$C_nH_{2n+1}$ and where $n$ varies from about 1 to 20; and
(b) then passing said stream through means for detecting the presence of tritium released by said column.

* * * * *